United States Patent
Arens et al.

(10) Patent No.: US 9,376,586 B2
(45) Date of Patent: Jun. 28, 2016

(54) COATING AGENTS WITH GOOD STORAGE STABILITY, AND COATINGS PRODUCED THEREFROM WITH HIGH SCRATCH RESISTANCE AND SIMULTANEOUSLY GOOD WEATHERING RESISTANCE

(75) Inventors: Christian Arens, Münster (DE); Matthijs Groenewolt, Münster (DE)

(73) Assignee: BASF Coatings GmbH, Munster (DE)

( * ) Notice: Subject to any disclaimer, the term of this patent is extended or adjusted under 35 U.S.C. 154(b) by 938 days.

(21) Appl. No.: 13/511,115

(22) PCT Filed: Oct. 16, 2010

(86) PCT No.: PCT/EP2010/006330
§ 371 (c)(1),
(2), (4) Date: Sep. 11, 2012

(87) PCT Pub. No.: WO2011/060858
PCT Pub. Date: May 26, 2011

(65) Prior Publication Data
US 2013/0190437 A1    Jul. 25, 2013

(30) Foreign Application Priority Data

Nov. 20, 2009   (DE) .......................... 10 2009 054 071

(51) Int. Cl.
| | |
|---|---|
| C08G 18/80 | (2006.01) |
| C09D 133/08 | (2006.01) |
| C08G 18/62 | (2006.01) |
| C08G 18/79 | (2006.01) |
| C09D 175/04 | (2006.01) |
| B05D 7/14 | (2006.01) |
| B05D 7/00 | (2006.01) |

(52) U.S. Cl.
CPC .......... *C09D 133/08* (2013.01); *C08G 18/6229* (2013.01); *C08G 18/6254* (2013.01); *C08G 18/792* (2013.01); *C08G 18/807* (2013.01); *C08G 18/809* (2013.01); *C09D 175/04* (2013.01); *B05D 7/14* (2013.01); *B05D 7/53* (2013.01)

(58) Field of Classification Search
CPC . C08G 18/807; C08G 18/6229; C09D 175/04
See application file for complete search history.

(56) References Cited

U.S. PATENT DOCUMENTS

| 410,542 | A | 9/1889 | Dowling |
|---|---|---|---|
| 4,598,131 | A | 7/1986 | Prucnal |
| 4,710,542 | A | 12/1987 | Forgione et al. |
| 5,716,678 | A | 2/1998 | Roeckrath et al. |
| 6,297,329 | B1 | 10/2001 | van den Berg et al. |
| 6,855,792 | B2 | 2/2005 | Speier et al. |
| 2003/0027921 | A1* | 2/2003 | Speier et al. .................. 524/589 |
| 2005/0209433 | A1 | 9/2005 | Barsotti et al. |
| 2011/0263789 | A1 | 10/2011 | Taniguchi et al. |

FOREIGN PATENT DOCUMENTS

| DE | 102007026722 A1 | 12/2008 |
|---|---|---|
| EP | 0008127 A1 | 2/1980 |
| EP | 0249201 A2 | 12/1987 |
| EP | 0276501 A2 | 8/1988 |
| EP | 0994117 A1 | 4/2000 |
| EP | 0692007 B1 | 12/2001 |
| EP | 1211273 A1 | 6/2002 |
| EP | 1225172 A1 | 7/2002 |
| EP | 1273640 A2 | 1/2003 |
| WO | WO9712945 A1 | 4/1997 |
| WO | WO0109260 A1 | 2/2001 |
| WO | WO2005092934 A1 | 10/2005 |
| WO | WO2008074489 A1 | 6/2008 |
| WO | WO2008110229 A2 | 9/2008 |
| WO | WO2008110230 A1 | 9/2008 |

OTHER PUBLICATIONS

International Preliminary Report on Patentability, International Application No. PCT/EP2010/006330 issued Jun. 12, 2012, 8 pages.
Römpp Lexikon "Lacke and Druckfarben," Georg Thieme Verlag, Stuttgart, 1998, pp. 250 to 252.
B. Singh, P.S. Forgione, J.A. Sedlak, L. Anderson, "Carbamylmethylated Melamines, Novel Crosslinkers for the Coatings Industry", Advanced Organic Coatings Science and Technology Series, 1991, pp. 193 to 207, vol. 13, Stamford, CT.
International Search Report for International Patent Application No. PCT/EP2010/006330 mailed Feb. 4, 2011, 4 pages.
Written Opinion of the International Searching Authority for International Patent Application No. PCT/EP2010/006330 mailed Feb. 4, 2011, 4 pages.

\* cited by examiner

*Primary Examiner* — Peter D Mulcahy
(74) *Attorney, Agent, or Firm* — Servilla Whitney LLC

(57) ABSTRACT

Disclosed are coating compositions including (A) at least one member selected from hydroxyl-containing polyacrylate, polymethacrylate, polyurethane, polyester, polysiloxane, and combinations of two or more of the foregoing, (B) at least one compound having blocked isocyanate groups and having alkoxysilane groups,
wherein (i) the hydroxyl groups of component (A) are blocked with at least one acyclic orthoester, (ii) the compound (B) has at least one structural unit (II)

$$-N(X\text{---}SiR''_x(OR)_{3-x})_n(X'\text{---}SiR''_y(OR)_{3-y})_m \quad (II),$$

where R=hydrogen, cycloalkyl radical or alkyl radical, X,X'=linear and/or branched alkylene or cycloalkylene radical having 1 to 20 carbon atoms, R''=alkyl, cycloalkyl, aryl or aralkyl, n, m, x, y=0 to 2, and also m+n=2, and (i) at least 90 mol % of the alkoxysilane groups are ethoxysilane groups. Also disclosed are multistage coating processes, use of the compositions as clearcoat materials and application of the processes for automotive OEM finishing.

20 Claims, No Drawings

COATING AGENTS WITH GOOD STORAGE STABILITY, AND COATINGS PRODUCED THEREFROM WITH HIGH SCRATCH RESISTANCE AND SIMULTANEOUSLY GOOD WEATHERING RESISTANCE

CROSS REFERENCE TO RELATED APPLICATIONS

This application is a National Phase Application of Patent Application PCT/EP2010/006330 filed on 16 Oct. 2010, which claims priority to DE102009054071.7, filed 20 Nov. 2009.

FIELD OF THE INVENTION

The present invention relates to thermally curable coating compositions based on aprotic solvents and comprising (A) at least one hydroxyl-containing polyacrylate and/or polymethacrylate and/or polyurethane and/or polyester and/or polysiloxane and at least one compound (B) having blocked isocyanate groups and having alkoxysilane groups.

BACKGROUND OF THE INVENTION

EP-A-1 211 273 discloses 1K [one-component] coating compositions which in addition to hydroxyl-containing binders comprise as crosslinker the reaction product of aliphatic and/or cycloaliphatic polyisocyanates with at least one secondary 3-aminopropyltrialkoxysilane and at least one blocking agent. Silane compounds used are preferably N-alkyl-3-aminopropyltrialkoxysilanes, more particularly N-butyl-3-aminopropyltrimethoxysilane. These coating compositions are notable for a crystallization tendency on the part of the blocked isocyanates which is less than that of conventional 1K coating compositions based on nonsilanized blocked isocyanates, and also an improved scratch resistance on the part of the resultant coatings. A particular disadvantage, however, is the inadequate storage stability of the coating compositions.

Also known, from WO08/110,229 and WO08/110,230, are 1K and 2K [two-component] coating compositions which in addition to hydroxyl-containing binders and amino resins and/or isocyanates comprise as crosslinker the reaction product of isocyanates with surface-active compounds and aminoalkyltrialkoxysilanes. The reaction products containing silane groups accumulate at the surface of the resultant coatings, where they lead to an increased crosslinking density as compared with the bulk. As a consequence of this, the coatings obtained are notable for enhanced scratch resistance and micropenetration hardness in conjunction with very good weathering stability and crack resistance. A parameter in need of improvement is the storage stability of the 1K coating compositions.

Additionally known, from WO05/092934, are 1K coating compositions, more particularly for automotive refinish, which comprise hydroxyl-containing poly(meth)acrylates blocked with orthoesters, as binders, and di- and/or polyisocyanates having free isocyanate groups, as crosslinkers. The coating compositions are notable for a reduced organic solvent content. Parameters in need of improvement are the scratch resistance of the resultant coatings and also the storage stability of the coating compositions.

Disclosed, furthermore, by EP-B-1 225 172 are coating compositions which comprise polyorthoesters (A), crosslinking agents (B) having groups that are reactive toward hydroxyl groups, such as blocked or nonblocked isocyanates, amino resins, epoxy resins, anhydrides or components containing alkoxysilane groups, and optionally hydroxyl-containing compounds (C). The polyorthoesters (A) are reaction products of (a) at least one monomeric α-glycol and/or β-glycol, (b) hydroxyl-containing oligomeric and/or polymeric compounds other than the glycols (a), such as hydroxyl-containing poly(meth)acrylates, with (c) orthoesters of C1 to C4 carboxylic acids, such as, more particularly, orthoformates and orthoacetates. Through the use of α-glycol and/or β-glycol in the preparation of the polyorthoesters, the aim is to avoid gelling of the polyorthoesters and to lower the viscosity of the resultant polyorthoesters. Information as to how the storage stability of the resulting coating compositions can be improved while nevertheless ensuring effective curing of the coating compositions is absent here, as is information on enhancing the scratch resistance of the resulting coating. Furthermore, the preparation of the polyorthoesters used therein is decidedly costly and inconvenient.

U.S. Pat. No. 6,297,329, finally, discloses coating compositions which comprise hydroxyl-containing monomeric or polymeric compounds blocked with bicyclic orthoesters or with spiro-orthoesters, optionally nonblocked hydroxyl-containing compounds, and crosslinking agents having groups that are reactive toward hydroxyl groups. As a result of the blocking with the specific orthoesters, the viscosity of the binders is lowered in comparison to the viscosity of the nonblocked binders, the aim of this being to allow provision of coating compositions having a relatively low solvent content. In addition, the sagging behavior of the coatings is improved, because the viscosity of the coating compositions after application is increased by virtue of the fact that, as a result of contact with atmospheric humidity, the orthoesters are eliminated and hence the hydroxyl-containing binders, which have a higher viscosity, are released again.

Examples of suitable groups in the crosslinking agents that are reactive toward hydroxyl groups are specified in U.S. Pat. No. 6,297,329 as being blocked or nonblocked isocyanate groups, acetal groups, epoxide groups, carboxyl groups, anhydride groups and/or alkoxysilane groups. Alternatively as crosslinking agents it is also possible to use amino resins. Information on how, through the selection of the crosslinking agents, it is possible to direct the properties of the resulting coatings, such as the scratch resistance, weathering stability, and acid resistance, for example, is absent, however, from the text. Here again, moreover, the storage stability of the coating compositions is a parameter in need of improvement.

The problem addressed by the present invention was that of providing coating compositions, more particularly for the clearcoat in automotive OEM finishing and in the finishing of parts for installation in or on automobiles, that have a very good storage stability, meaning that the viscosity on storage at temperatures of 40° C. must not increase by more than 50% within 28 days. At the same time, the coating compositions ought also to ensure very good curing under the curing conditions that are typical in the automobile finishing segment, more particularly at temperatures of 100 to 200° C. for a time of 10 minutes up to 1 hour.

Furthermore, the coating compositions ought to result in high-gloss coatings which are highly scratch resistant and in particular exhibit a high gloss retention after scratch exposure. Moreover, the resultant coatings and coating systems, especially the clearcoat systems, ought to be suitable for use even for the technologically and aesthetically particularly demanding field of automotive OEM finishing. Hence the coatings ought also to have a good acid resistance and low yellowing on baking. Furthermore, the new coating compositions are to be preparable easily and very reproducibly, and are not to cause any environmental problems during application of the coating material.

SUMMARY OF THE INVENTION

In light of the problem stated above, coating compositions have been found which are based on aprotic solvents and comprise
(A) at least one hydroxyl-containing polyacrylate and/or polymethacrylate and/or polyurethane and/or polyester and/or polysiloxane and
(B) at least one compound (B) having blocked isocyanate groups and having alkoxysilane groups,
characterized in that
(i) the hydroxyl groups of component (A) are blocked with at least one acyclic orthoester,
(ii) the compound (B) has at least one structural unit (II) of the formula (II)

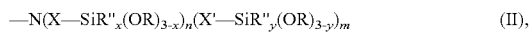
—N(X—SiR''$_x$(OR)$_{3-x}$)$_n$(X'—SiR''$_y$(OR)$_{3-y}$)$_m$  (II), where
R=hydrogen, cycloalkyl radical or alkyl radical, it being possible for the carbon chain to be interrupted by nonadjacent oxygen, sulfur or NRa groups, where Ra=alkyl, cycloalkyl, aryl or aralkyl,
X, X'=linear and/or branched alkylene or cycloalkylene radical having 1 to 20 carbon atoms, preferably X, X'=alkylene radical having 1 to 4 carbon atoms,
R''=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R''=alkyl radical, more particularly having 1 to 6 C atoms,
n=0 to 2, m=0 to 2, m+n=2, and x, y=0 to 2, and
(iii) at least 90 mol % of the total alkoxysilane groups present in component (B) are ethoxysilane groups SiOC$_2$H$_5$.

The present invention further provides multistage coating processes using these coating compositions, and also the use of the coating compositions as clearcoat material and application of the coating process for automotive OEM finishing and the finishing of parts for installation in or on automobiles.

In view of the prior art it was surprising and unforeseeable for the skilled worker that the problems addressed by the present invention could be solved by means of the coating compositions of the invention.

Hence it is particularly surprising that the coating compositions of the invention exhibit very good storage stability in conjunction with very good curing. Indeed, the viscosity of the coating compositions does not rise by more than 50% on storage at temperatures of 40° C. within 28 days. At the same time, however, the coating compositions also exhibit very good curing under the curing conditions that are typical in the automotive finishing segment, more particularly at temperatures of 100 to 200° C. for a time of 10 minutes up to 1 hour.

A further advantage is that the coating compositions of the invention lead to coatings which are highly scratch resistant and more particularly exhibit a high gloss retention after scratch exposure.

At the same time the coating compositions of the invention afford new coatings and coating systems, especially clearcoat systems, which can also be produced in coat thicknesses greater than 40 μm without stress cracks occurring. Consequently the coatings and coating systems of the invention, more particularly the clearcoat systems, can be employed in the technologically and aesthetically particularly demanding area of automotive OEM finishing. The coatings also exhibit good acid resistance and low yellowing on baking.

Finally, the coating compositions of the invention can be prepared particularly easily and very reproducibly, and on application of the coating material do not give rise to any significant toxicological or environmental problems.

DETAILED DESCRIPTION OF AN EMBODIMENT OF THE INVENTION

The Coating Compositions of the Invention
The Hydroxyl-Containing Compounds (A)
It is essential to the invention that the coating compositions comprise as component (A) at least one hydroxyl-containing polyacrylate and/or at least one hydroxyl-containing polymethacrylate and/or at least one hydroxyl-containing polyurethane and/or at least one hydroxyl-containing polysiloxane and/or at least one hydroxyl-containing polyester.

The preferred oligomeric and/or polymeric polyols (A) have mass-average molecular weights Mw>500 daltons, as measured by means of GPC (gel permeation chromatography), preferably between 800 and 100 000 daltons, more particularly between 1000 and 50 000 daltons.

The polyols preferably have an OH number of 30 to 300 mg KOH/g, more particularly between 100 and 200 mg KOH/g.

The glass transition temperatures of the polyols are preferably between −150 and 100° C., more preferably between −120° C. and less than 10° C. The glass transition temperature is determined by means of DSC measurements in accordance with DIN-EN-ISO 11357-2.

It is particularly preferred as component (A) to use polyols which have primary hydroxyl groups, since these polyols can be blocked particularly advantageously and completely with the orthoesters.

Suitable polyester polyols are described for example in EP-A-0 994 117, EP-A-1 273 640, and DE 102007026722. Polyurethane polyols are prepared preferably by reacting polyester polyol prepolymers with suitable di- or polyisocyanates, and are described for example in EP-A-1 273 640. Suitable polysiloxane polyols are described for example in WO-A-01/09260, it being possible to employ the polysiloxane polyols cited therein preferably in combination with further polyols, more particularly those having higher glass transition temperatures.

The polyacrylate polyols and/or polymethacrylate polyols and their copolymers, referred to below as polyacrylate polyols, that are especially preferred in accordance with the invention are generally copolymers and preferably have mass-average molecular weights Mw of between 1000 and 20 000 daltons, more particularly between 1500 and 10 000 daltons, as measured in each case by means of gel permeation chromatography (GPC) against polystyrene standard.

The glass transition temperature of the copolymers is generally between −100 and 100° C., more particularly between −50 and less than 10° C. The glass transition temperature is determined by means of DSC measurements in accordance with DIN-EN-ISO 11357-2.

The polyacrylate polyols preferably have an OH number of 60 to 250 mg KOH/g, more particularly between 70 and 200 KOH/g. The OH number indicates the number of mg of potassium hydroxide that are equivalent to the amount of acetic acid bound in acetylation by 1 g of substance. For the determination, the sample is boiled with acetic anhydride/pyridine, and the resultant acid is titrated with potassium hydroxide solution (DIN 53240-2).

Through the selection of the hydroxyl-containing binders as well it is possible to influence the properties of the ultimately cured coating. Generally speaking, indeed, as the OH number of component (A) goes up, it is possible to lower the degree of silanization, i.e., the amount of structural units of the formula (II) and optionally (III), and this, in turn, has a positive effect on the weathering stability of the ultimately cured coating.

The polyacrylate polyols preferably have an acid number of between 0 and 30 mg KOH/g.

The acid number in this case indicates the number of mg of potassium hydroxide which are consumed in neutralizing 1 g of the respective compound of component (A) (DIN EN ISO 2114).

As hydroxyl-containing monomer building blocks it is preferred to use hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and also 4-hydroxybutyl acrylate and/or 4-hydroxybutyl methacrylate. As hydroxyl-containing monomer building blocks it is particularly preferred to use hydroxyalkyl acrylates and/or hydroxyalkyl methacrylates having primary hydroxyl groups, more particularly 4-hydroxybutyl acrylate and/or 4-hydroxybutyl methacrylate.

Further monomer building blocks used for the polyacrylate polyols are preferably alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate.

As further monomer building blocks for the polyacrylate polyols it is possible to use vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

It is essential to the invention that the hydroxyl groups of component (A) are blocked with at least one acyclic orthoester.

Preferably the hydroxyl groups of component (A) are blocked with at least one acyclic orthoester of the formula (I)

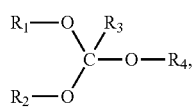 (I)

where
$R_1$, $R_2$, and $R_4$ are identical or different radicals and independently of one another are a linear and/or branched alkylene or cycloalkylene radical having 1 to 8 carbon atoms, preferably an alkylene radical having 1 to 4 carbon atoms, and
$R_3$ is hydrogen or an alkylene radical having 1 to 6 carbon atoms.

Examples of suitable orthoesters (I) are the orthoesters of formic acid ($R_3$ hydrogen), such as trimethyl orthoformate and triethyl orthoformate, the orthoesters of acetic acid ($R_3$ methyl), such as trimethyl orthoacetate and triethyl orthoacetate, the orthoesters of propionic acid ($R_3$ ethyl), such as trimethyl orthopropionate and triethyl orthopropionate, for example, and the orthoesters of butyric acid ($R_3$ propyl and/or isopropyl).

With particular preference the hydroxyl groups of component (A) are blocked with an orthoester of acetic acid, more particularly with trimethyl orthoacetate and/or triethyl orthoacetate, and/or with an orthoester of formic acid, more particularly trimethyl orthoformate and triethyl orthoformate. With very particular preference the hydroxyl groups of component (A) are blocked with an orthoester of acetic acid, more particularly with trimethyl orthoacetate and/or triethyl orthoacetate.

The reaction of the hydroxyl-containing compounds (A) with the orthoesters, more particularly the orthoesters (I), takes place typically in a manner known to the skilled worker, in an organic solvent, at elevated temperatures, more particularly at temperatures between 40 and 100° C., optionally in the presence of suitable catalysts, as is described as well, for example, in WO05/092934, page 11, last paragraph, to page 12, first paragraph.

This reaction takes place advantageously using an excess of orthoesters (I), since in this way it is very easy to prevent gelling of the products. With particular preference the reaction of the hydroxyl-containing compounds (A) with the orthoesters takes place using an excess of more than 100 mol %, more particularly an excess of 150 to 250 mol %, of orthoester (I), based on the amount of hydroxyl groups in the compounds (A).

The orthoesters (I) function here as a solvent for component (A) and also, in the coating composition, for the entire coating composition of the invention. Coating compositions preferred in accordance with the invention therefore comprise as solvent the orthoester or orthoesters (I) used for blocking the hydroxyl groups. It is preferred to use further organic aprotic solvents together with the orthoester.

Furthermore, it is preferred to use hydroxyl-containing compounds (A) which have primary hydroxyl groups. With particular preference more than 60 mol %, more particularly more than 80 mol %, and very preferably more than 90 mol %, and very especially preferably substantially all, of the hydroxyl groups in the compounds (A) are primary hydroxyl groups, since this ensures maximum storage stability in conjunction with effective curing of the coating compositions.

The Compounds (B) Having Blocked Isocyanate Groups and Alkoxy-Silane Groups

As component (B), the coating compositions of the invention comprise one or more compounds having blocked isocyanate groups and having alkoxysilane groups.

The di- and/or polyisocyanates which serve as parent structures for the isocyanato-containing compounds (B) used preferably in accordance with the invention are preferably conventional substituted or unsubstituted aromatic, aliphatic, cycloaliphatic and/or heterocyclic polyisocyanates. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Additionally preferred polyisocyanates are the biuret dimers and the isocyanurate trimers of the aforementioned diisocyanates.

Particularly preferred polyisocyanates PI are hexamethylene 1,6-diisocyanate, isophorone diisocyanate, and 4,4'-methylenedicyclohexyl diisocyanate, their biuret dimers and/or isocyanurate trimers.

In another embodiment of the invention the polyisocyanates are polyisocyanate prepolymers having urethane structural units, which are obtained by reacting polyols with a stoichiometric excess of aforementioned polyisocyanates. Polyisocyanate prepolymers of this kind are described for example in U.S. Pat. No. 4,598,131.

It is essential to the invention that the compound (B) has at least one structural unit (II) of the formula (II)

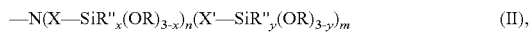

where
R=hydrogen, cycloalkyl radical or alkyl radical, it being possible for the carbon chain to be interrupted by nonadjacent oxygen, sulfur or NRa groups, where Ra=alkyl, cycloalkyl, aryl or aralkyl, preferably R=an ethyl radical or a mixture of an ethyl radical plus a methyl radical,
X, X'=linear and/or branched alkylene or cycloalkylene radical having 1 to 20 carbon atoms, preferably X, X'=alkylene radical having 1 to 4 carbon atoms,
R''=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R''=alkyl radical, more particularly having 1 to 6 C atoms,
n=0 to 2,
m=0 to 2,
m+n=2, and
x, y=0 to 2, preferably 0 to 1, more preferably x and y=0, and where at least 90 mol % of the total alkoxysilane groups present in component (B) are ethoxysilane groups $SiOC_2H_5$.

Where component (B) has only alkoxysilane groups in the form of the structural units (II), therefore, at least 90 mol % of the SiOR groups in the formula (II) must be ethoxysilane groups $SiOC_2H_5$. It is also possible, however, for component (B) to have further alkoxysilane groups in addition to the structural units (II). In that case at least 90 mol % of the total alkoxysilane groups present in component (B) must be ethoxysilane groups $SiOC_2H_5$.

Preference is also given to coating compositions in which the compound (B) has at least one structural unit (II') of the formula (II')

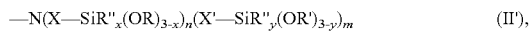

where
R=an ethyl radical and R'=a methyl radical and R'', X and X', n, m, x and y have the definitions stated for formula (II).

Preference is also given to coating compositions in which at least a part of the compound (B), in addition to the structural units (II), also has at least one structural unit (III) of the formula (III)

where
$R_s$=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R, R'' and X have the definitions stated for formula (II), and x=0 to 2, preferably 0 to 1, more preferably x=0.

Particular preference is given to coating compositions in which the isocyanato-containing compound (B) has 5 mol % to 95 mol %, preferably more than 10 mol % to 90 mol %, more preferably 20 to 80 mol %, very preferably 30 to 70 mol %, of at least one structural unit (II) of the formula (II) and 5 mol % to 95 mol %, preferably 10 to less than 90 mol %, more preferably 20 to 80 mol %, very preferably 30 to 70 mol %, of at least one structural unit (III) of the formula (III), based in each case on the entirety of structural units (II) and (III).

Here it should be noted that—with account being taken, of course, of the mixing ratio of the structural units (II) and (III)—the structure of the SiOR groups in the structural units (II) and (III) should be selected such that at least 90 mol % of the total alkoxysilane groups present in component (B) are ethoxysilane groups $SiOC_2H_5$. Where, for example, all of the alkoxysilane groups SiOR in the structural unit (II) are ethoxysilane groups, and where the fraction of alkoxysilane groups SiOR in the structural units (III) is only 10 mol %, based on the sum of the structural units (II) plus (III), then it is also possible for exclusively methoxysilane groups to be used in the structural unit (III).

The respective alkoxysilane groups SiOR in the structural units (II) and (III) may be identical or different; critical to the structure of the radicals, however, is the extent to which they influence the reactivity of the hydrolyzable silane groups. Only through the use of the high fraction of ethoxysilane groups of at least 90 mol %, indeed, is it ensured, surprisingly, that on the one hand the storage stability of the coating compositions is very good and that on the other hand, however, very effective curing of the coating compositions is ensured as well.

Preferred coating compositions are obtained when at least 95 mol % of the total alkoxysilane groups present in component (B) are ethoxysilane groups $SiOC_2H_5$. With particular preference all of the alkoxysilane groups present in component (B) are ethoxysilane groups $SiOC_2H_5$.

The structure of the silane radicals affects their reactivity. With regard to the compatibility and the reactivity of the silanes, silanes having 3 hydrolyzable groups are employed with preference; that is in the structural units (II) and (III), x and y are in each case 0.

The structural unit (II) of the formula (II) and optionally the structural unit (III) of the formula (III) are introduced into component (B) preferably by virtue of the fact that some of the isocyanate groups in the abovementioned diisocyanates and/or polyisocyanates have been reacted with at least one compound of the formula (IIa)

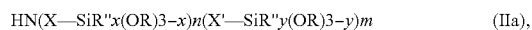

and optionally with at least one compound of the formula (IIIa)

the substituents having the definition stated above.

The remaining isocyanate groups in the abovementioned diisocyanates and/or polyisocyanates are reacted with at least one blocking agent. For the blocking it is possible in principle to use any blocking agent which can be used to block polyisocyanates and has a sufficiently low deblocking temperature.

The isocyanate groups of component (B) are preferably blocked with a pyrazole. Suitable in particular are pyrazoles of the formula (IV)

where $R_{20}$ can be an alkyl radical, aryl radical or aralkyl radical, an N-substituted carbamyl radical, a phenyl radical, an ester radical or halogen radical, and n is an integer, and n=0, 1, 2 or 3. In the case of more than one radical $R_{20}$, the radicals may be identical or different. Suitable pyrazoles are also described in EP-A-159 117, pages 3 to 4.

With particular preference the isocyanate groups of component (B) are blocked with substituted pyrazoles. Contemplated more particularly here are alkyl-substituted pyrazoles. Blocking agents used more particularly are pyrazoles of the formula (IV) in which $R_{20}$ is an alkyl radical, more particularly having 1 to 4 C atoms, and in which n=1, 2 or 3. Examples of blocking agents which can be used include 3-methylpyrazole, 3,5-dimethylpyrazole, 4-nitro-3,5-dimethylpyrazole, 4-bromo-3,5-dimethylpyrazole, and so on. With very particular preference the isocyanate groups of component (B) are blocked with 3,5-dimethylpyrazole.

The reaction of the diisocyanates and/or polyisocyanates with the blocking agents may take place, in particular, before or after the reaction with the compound of the formula (IIa) and, where used, with the compound of the formula (IIIa), although generally it is also possible for simultaneous reaction with the blocking agents and the silanes (IIa) and, where used, (IIIa) to be carried out. With particular preference, however, first of all some of the isocyanate groups of the diisocyanates and/or polyisocyanates are reacted with the blocking agents, and subsequently the remaining free isocyanate groups are reacted with the compound of the formula (IIa) and, where used, with the compound of the formula (IIIa).

The reaction of the di- and/or polyisocyanates with the blocking agents takes place preferably in a solvent, more particularly an aprotic solvent. The temperatures in this case are generally between 20 and 100° C.

The reaction of the diisocyanates and/or polyisocyanates with the compounds (IIa) and (IIIa) takes place preferably in an inert gas atmosphere at temperatures of not more than 100° C., preferably of not more than 60° C., in a solvent or solvent mixture. The solvent or solvent mixture may be composed of aromatic hydrocarbons such as 1,2,4-trimethylbenzene, mesitylene, xylene, propylbenzene, and isopropylbenzene. One example of a suitable solvent mixture comprising aromatic hydrocarbons is solvent naphtha. The solvent in which the polyisocyanate curing agents are prepared may also be composed of aliphatic hydrocarbons, ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents, preference being given to solvent mixtures having a high butyl acetate fraction, more particularly at least 60% by weight of butyl acetate, based on the total weight of the solvent mixture. With particular preference the solvent mixture comprises at least 80% by weight of butyl acetate.

Particularly preferred in accordance with the invention are coating compositions which have a calculated silicon content of 2.0% to 7.0% by mass Si, preferably a calculated silicon content of 3.0% to 6.0% by mass Si, based in each case on the solids content of the coating composition.

The Combination of Components (A) and (B) and Also Further Components of the Coating Composition The weight fractions of the polyol (A) and the polyisocyanate (B) are preferably selected such that the molar equivalent ratio of the blocked isocyanate groups of the isocyanate-containing compounds (B) to the hydroxyl groups of the hydroxyl-containing compounds (A) is between 0.9:1 and 1:1.1, preferably between 0.95:1 and 1.05:1, more preferably between 0.98:1 and 1.02:1.

In accordance with the invention it is preferred to use coating compositions which comprise from 20% to 80% by weight, preferably from 30% to 70% by weight, based in each case on the solids content of the coating composition, of at least one hydroxyl-containing polyacrylate and/or polymethacrylate and/or polyurethane and/or polyester and/or polysiloxane, preferably of at least one hydroxyl-containing polyacrylate (A) and/or of at least one hydroxyl-containing polymethacrylate (A).

In accordance with the invention it is preferred to use coating compositions which comprise from 20% to 80% by weight, preferably from 30% to 70% by weight, based in each case on the solids content of the coating composition, of at least one isocyanato-containing compound (B).

Catalyst (D)

The coating compositions of the invention typically comprise at least one acid-based catalyst (D). As catalysts (D) for the deblocking of the hydroxyl groups and for the crosslinking of the alkoxysilane groups, and also for the reaction between the hydroxyl groups of the compound (A) and the free isocyanate groups of the compound (B), it is possible to use compounds that are known per se.

The coating compositions of the invention more particularly comprise at least one acid catalyst based on organic acids and derivatives thereof and also based on inorganic acids and derivatives thereof. The selection of the acid catalysts should be made with the proviso that the storage stability of the coating compositions is ensured, i.e., the reactivity of the catalysts at ambient temperature must not be too high.

Preference is given here to using catalysts based on sulfonic acids and their derivatives. Use is preferably made, therefore, for example, of methanesulfonic acid, ethanesulfonic acid, p-toluenesulfonic acid, dodecylbenzylsulfonic acid, dinonylnaphthylsulfonic acid, and the corresponding esters of the sulfonic acids, and the corresponding amine adducts of the stated sulfonic acids. Particular preference is given to using acid catalysts based on p-toluenesulfonic acid.

The catalyst (D) is used typically in fractions of 0.01% to 20% by weight, more preferably in fractions of 0.1% to 10% by weight, based on the nonvolatile constituents of the coating composition of the invention. In this context, a lower activity on the part of the catalyst may be partly compensated by correspondingly higher quantities employed.

The coating compositions of the invention preferably further comprise at least one organometallic compound. Examples include catalysts which are customary in PU technology, from the group of Sn(II), Sn(IV), Zn(II), and Bi compounds. As organometallic compounds it is preferred to use dibutyltin dilaurate, dibutyltin oxide, dioctyltin oxide, bismuth lactate, bismuth oxide, and, in particular, dibutyltin dilaurate.

The organometallic compound is used typically in fractions of 0.01% to 10% by weight, more preferably in fractions of 0.1% to 5% by weight, based on the nonvolatile constituents of the coating composition of the invention.

Besides the compounds (A) and (B) it is also possible, if desired, to use further binders (E) as well, which are preferably able to react with the hydroxyl groups of the poly(meth)acrylate (A) and/or with the isocyanate groups of the compound (B) and/or with the alkoxysilyl groups of the compounds (B) and to form network nodes.

As component (E) it is possible, for example, to use amino resins and/or epoxy resins. Suitable amino resins include the customary and known amino resins, some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry", in Advanced Organic Coatings Science and Technology Series, 1991, Volume 13, pages 193 to 207.

Generally speaking, such components (E) are used in fractions of up to 40%, preferably of up to 30%, more preferably of up to 25%, by weight, based on the nonvolatile constituents of the coating composition.

Suitable solvents for the coating compositions of the invention are more particularly those which within the coating composition are chemically inert toward the compounds (A), (B), and, where used, (E), and which also do not react with (A), (B) or, where used, (E) during the curing of the coating composition. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1% by weight, more preferably not more than 0.5% by weight, based on the solvent.

Furthermore, the binder mixture of the invention or the coating composition of the invention may comprise at least one customary and known coatings additive (F) in effective amounts, i.e., in amounts preferably up to 30%, more preferably up to 25%, and more particularly up to 20%, by weight, based in each case on the nonvolatile constituents of the coating composition.

Examples of suitable coatings additives (F) are as follows:
in particular, UV absorbers;
in particular, light stabilizers such as HALS compounds, benzotriazoles or oxalanilides;
to free-radical scavengers;
slip additives;
polymerization inhibitors;
defoamers;
reactive diluents, of the kind which are general knowledge from the prior art, and which are preferably inert toward the —Si(OR)$_3$ groups;
wetting agents such as siloxanes, fluorine compounds, carboxylic monoesters, phosphoric esters, polyacrylic acids and copolymers thereof or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben", Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, of the kind disclosed, for example, in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils®; or synthetic polymers containing ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;
flame retardants; and/or
water scavengers.

In another embodiment of the invention, the coating composition of the invention may also comprise other pigments and/or fillers and may serve for the production of pigmented topcoats. The pigments and/or fillers employed for this purpose are known to the skilled worker.

The coatings of the invention that are produced from the coating compositions of the invention adhere outstandingly even to already cured electrocoats, surfacer coats, basecoats or customary and known clearcoats, and are outstandingly suitable, as well as for use in automotive OEM (production-line) finishing, for the modular scratchproofing of automobile bodies that have already been finished.

The coating compositions of the invention are notable for very good storage stability in conjunction with very good curing under the curing conditions typical in the automotive finishing segment, more particularly at temperatures of 100 to 200° C. for a time of 10 minutes up to 1 hour.

The coating compositions of the invention may be applied by any of the customary application methods, such as spraying, knifecoating, spreading, pouring, dipping, impregnating, trickling or rolling, for example. At application, the substrate to be coated may itself be at rest, with the application device or installation being moved. Alternatively the substrate to be coated, more particularly a coil, may be moving, with the application equipment being at rest relative to the substrate or being moved appropriately.

It is preferred to employ spray application methods, such as, for example, compressed air spraying, airless spraying, high-speed rotation, electrostatic spray application (ESTA), alone or in conjunction with hot spray application such as hot air spraying, for example.

The curing of the applied coating compositions of the invention may take place after a certain rest time. The rest time is used, for example, for the leveling and for the devolatilization of the coating films, or for the evaporation of volatile constituents such as solvents. The rest time may be assisted and/or shortened through the application of elevated temperatures and/or through a reduced atmospheric humidity, provided this does not entail any damage or change to the coating films, such as premature complete crosslinking, for instance.

The thermal curing of the coating compositions has no peculiarities of method but instead takes place in accordance with the customary and known methods such as heating in a forced-air oven or irradiation using IR lamps. This thermal curing may also take place in stages. Another preferred curing method is that of curing with near infrared (NIR radiation).

The thermal curing takes place advantageously at a temperature of 100 to 200° C., more preferably 120 to 180° C., for a time of 10 minutes up to 1 hour; at the lower temperatures employed for the coating of plastics parts, it is also possible for longer curing times to be employed.

The coating compositions of the invention provide new cured coatings, more particularly coating systems, especially clearcoat systems, moldings, especially optical moldings, and self-supporting sheets that are highly scratch-resistant and more particularly feature a high gloss retention after scratch exposure. Moreover, the coatings obtained in accordance with the invention also exhibit good acid resistance and low yellowing on baking. Finally, the coatings and coating systems of the invention, especially the clearcoat systems, can be produced even at coat thicknesses>40 μm without stress cracks occurring.

The coating compositions of the invention are therefore outstandingly suitable as decorative, protective and/or effect-imparting, highly scratch-resistant coatings and coating systems on bodywork of means of transport (more particularly motor vehicles, such as motorcycles, buses, trucks or automobiles) or of parts thereof; of buildings, in the interior and exterior; of furniture, windows, and doors; of plastics moldings, more particularly CDs and windows; of small industrial parts, of coils, containers, and packaging; of white goods; of films; of optical, electrical, and mechanical components; and also of hollow glassware and articles of everyday use.

More particularly the coating compositions and coating systems of the invention, especially the clearcoats, are employed in the technologically and aesthetically particularly demanding field of automotive OEM finishing and for the coating of plastics parts for installation in or on automobile bodies, particularly for top-class automobile bodies, such as, for example, for the production of roofs, tailgates, hoods, fenders, bumpers, spoilers, cills, protective strips, side trim, and so on.

The plastics parts are composed typically of ASA, polycarbonates, blends of ASA and polycarbonates, polypropylene, polymethyl methacrylates or impact-modified polymethyl methacrylates, more particularly of blends of ASA and polycarbonates, used preferably with a polycarbonate fraction>40%, more particularly >50%.

By ASA is meant, generally, impact-modified styrene/acrylonitrile polymers where graft copolymers of vinylaromatic compounds, especially styrene, and of vinyl cyanides, especially acrylonitrile, on polyalkyl acrylate rubbers are present in a copolymer matrix comprising, in particular, styrene and acrylonitrile.

With particular preference the coating compositions of the invention are employed in multistage coating processes, more particularly in processes in which an optionally precoated substrate is coated first with a pigmented basecoat, after which a coat with the coating composition of the invention is applied. The invention accordingly also provides multicoat color and/or effect paint systems comprising at least one pigmented basecoat and at least one clearcoat disposed thereon, wherein the clearcoat has been produced from the coating composition of the invention.

Not only water-thinnable basecoat materials but also basecoat materials based on organic solvents can be used. Suitable basecoat materials are described, for example, in EP-A-0 692 007 and in the documents listed therein at column 3 lines 50ff. Preferably the applied basecoat material is first dried, which means that the basecoat film, in an evaporation phase, has at least some of the organic solvent and/or water removed from it. Drying takes place preferably at temperatures from room temperature to 80° C. After the drying, the coating composition of the invention is applied. The two-coat system is subsequently baked under conditions which are employed in the context of automotive OEM finishing, at temperatures of 100 to 200° C., more preferably 120 to 180° C., for a time of 10 minutes up to 1 hour.

The coats produced with the coating composition of the invention are notable in particular for especially high scratch resistance and more particularly for a high gloss retention after scratch exposure. Moreover, the coatings obtained in accordance with the invention also have good acid resistance and low yellowing on baking. Finally, the coatings and coating systems of the invention, especially the clearcoat systems, can be produced even at coat thicknesses>40 μm without stress cracks occurring.

In another preferred embodiment of the invention, the coating composition of the invention is used as a transparent clearcoat material for coating plastics substrates, more particularly plastics parts for installation in or on a vehicle. These parts are preferably likewise coated in a multistage coating process, in which an optionally precoated substrate or a substrate pretreated for improved adhesion of the subsequent coats (for example, by flame, corona or plasma treatment of the substrate) is first coated with a pigmented basecoat, after which a layer with the coating composition of the invention is applied.

Finally, the coating composition of the invention is used as a transparent clearcoat material for coating transparent plastics substrates. In this case the coating compositions comprise UV absorbers which in terms of their quantity and type are designed for the effective UV protection of the plastics substrate. Here again, the resultant coatings are notable for an outstanding combination of scratch resistance and more particularly a high gloss retention after scratch exposure. Moreover, the coatings obtained in accordance with the invention have good acid resistance and low yellowing on baking. Finally, the coatings and coating systems of the invention, especially the clearcoats, can be produced even at coat thicknesses>40 μm without stress cracks occurring. The transparent plastics substrates thus coated are employed preferably for the replacement of glass components in automobile construction, the plastics substrates being composed preferably of polymethyl methacrylate or polycarbonate.

EXAMPLES

Preparation of the Poly(Meth)Acrylate Resin with Nonblocked Hydroxyl Groups A'1

A double-walled 4 l stainless steel tank which can be heated by means of an oil circulation thermostat and is equipped with thermometer, anchor stirrer, 2 dropping funnels, and reflux condenser is charged with solvent for the polymerization. One of the dropping funnels is charged with the monomer mixture, the second dropping funnel with the initiator solution, comprising a suitable initiator (generally a peroxide). The initial charge is heated to a polymerization temperature of 140° C. When the polymerization temperature is reached, first of all the initiator feed is commenced. 15 minutes after the start of the initiator feed, the monomer feed (duration: 240 minutes) is commenced. The initiator feed is set such that it continues for 30 minutes after the end of the monomer feed. After the end of the initiator feed, the mixture is stirred at 140° C. for a further 2 hours and then cooled to room temperature. The reaction mixture is subsequently adjusted with solvent to the solids content specified in table 2.

TABLE 1

Monomer composition of the binder (A'1) in parts by weight

| Component | Example 1 (A'1) Part(s) by weight |
| --- | --- |
| Styrene | 8.0 |
| n-Butyl methacrylate | 8.0 |
| Acrylic acid | 0.6 |
| 4-Hydroxybutyl acrylate | 12.0 |
| 2-Hydroxyethyl acrylate | 12.0 |
| n-Butyl acrylate | 19.0 |

TABLE 2

Characteristics of the binder (A'1)

| | Example 1 |
| --- | --- |
| Binder | (A'1) |
| Solids 1 h 150° C. | 65% |
| Acid No.[1] [mgKOH/g] | 8-12 |
| OH number[2] calculated [mgKOH/g] | 175 |
| Tg (FOX)[3] ° C. | −27 |

[1] experimentally determined acid number
[2] calculated OH number based on the amount of hydroxyl-containing monomers
[3] glass transition temperature calculated using the Fox equation Preparation of the Poly(Meth)Acrylate Resin A1 with Blocked Hydroxyl Groups A steel reactor equipped with a reflux condenser and a thermometer is charged with 55 parts of the hydroxyl-containing polyacrylate (A'1), 4.6 parts of solvent naphtha, and 0.2 part of glacial acetic acid. Under nitrogen blanketing and with stirring, 40.2 parts of trimethyl orthoacetate are metered in slowly via a dropping funnel at room temperature. After the end of the addition, the reaction temperature is raised to 50-60° C. and maintained. The reaction is over after about 7 hours. The product is a clear solution. The end product is checked by means of IR spectroscopy for complete blocking of the OH functions.

Solids of the polyacrylate (A1) with blocked hydroxyl groups (SC), 1 h at 120° C.: about 39%

Preparation of a Curing Agent (B1) Having a Degree of Silanization of the Isocyanate Groups of c=40 mol %, a Fraction of 100 mol % of Ethoxysilane Groups, and Complete Blocking of the Remaining Isocyanate Groups A steel reactor equipped with a reflux condenser and a thermometer is charged with 28.8 parts of trimerized hexamethylene diisocyanate (HDI) (Basonat HI 100 from BASF SE), 25.1 parts of butyl acetate, and 8.7 parts of 3,5-dimethylpyrazole (DMP). Under nitrogen blanketing and with stirring, a temperature rise to around 65° C. is observed. Thereafter the reaction temperature is maintained at around 50-60° C. for around 2 hours. After this first blocking phase, the target residual NCO of 4.04% is checked by means of titration. This is followed by the silanization of the remaining free isocyanate groups. The reaction mixture is cooled. An additional 11.8 parts of butyl acetate are fed in. Subsequently, via a dropping funnel, 25.6 parts of bis-[3-(triethoxysilyl)propyl]amine (Dynasylan 1122, Degussa, Rheinfelden) are added. During this addition it should be ensured that the temperature of 60° C. is not exceeded. The reaction mixture is stirred at 50-60° C. for 2 hours. The product is a clear solution. Titration is used to check that there is no longer any free NCO present.

Solids (SC) theoretical: 63%; NCO content based on solution when the DMP deblocks on baking of the clearcoat: 3.80%

Preparation of a Curing Agent (B2) Having a Degree of Silanization of the Isocyanate Groups of c=40 mol %, a Fraction of 95 mol % of Ethoxysilane Groups and 5 mol % of Methoxysilane Groups, and with Complete Blocking of the Remaining Isocyanate Groups A steel reactor equipped with a reflux condenser and a thermometer is charged with 29.4 parts of trimerized hexamethylene diisocyanate (HDI) (Basonat HI 100 from BASF SE), 25.6 parts of butyl acetate, and 8.9 parts of 3,5-dimethylpyrazole (DMP). Under nitrogen blanketing and with stirring, a temperature rise to around 65° C. is observed. Thereafter the reaction temperature is maintained at around 50-60° C. for around 2 hours. After this first blocking phase, the target residual NCO of 4.04% is checked by means of titration. This is followed by the silanization of the remaining free isocyanate groups. The reaction mixture is cooled. Subsequently, via a dropping funnel, a mixture of 22.9 parts of bis-[3-(triethoxysilyl)propyl]amine (Dynasylan 1122, Degussa, Rheinfelden) and 1.8 parts of trimethoxypropylsilylamine (Dynasilan 1189, Evonik) in 11.4 parts of butyl acetate is added. During this addition it should be ensured that the temperature of 60° C. is not exceeded. The reaction mixture is stirred at 50-60° C. for 2 hours. The product is a clear solution. Titration is used to check that there is no longer any free NCO present.

Solids (SC) theoretical: 63%; NCO content based on solution when the DMP deblocks on baking of the clearcoat: 3.80%

Preparation of a Noninventive Curing Agent (B3) Having a Degree of Silanization of the Isocyanate Groups of c=40 mol %, a Fraction of 100 mol % of Methoxysilane Groups, and with Complete Blocking of the Remaining Isocyanate Groups A steel reactor equipped with a reflux condenser and a thermometer is charged with 31.2 parts of trimerized hexamethylene diisocyanate (HDI) (Basonat HI 100 from BASF SE), 27.3 parts of butyl acetate, and 9.4 parts of 3,5-dimethylpyrazole (DMP). Under nitrogen blanketing and with stirring, a temperature rise to around 65° C. is observed. Thereafter the reaction temperature is maintained at around 50-60° C. for around 2 hours. After this first blocking phase, the target residual NCO of 4.04% is checked by means of titration. This is followed by the silanization of the remaining free isocyanate groups. The reaction mixture is cooled. Subsequently, via a dropping funnel, 22.4 parts of bis-[3-(trimethoxysilyl)propyl]amine (Dynasylan 1124, Degussa, Rheinfelden) in 9.7 parts of butyl acetate are added. During this addition it should be ensured that the temperature of 60° C. is not exceeded. The reaction mixture is stirred at 50-60° C. for 2 hours. The product is a clear solution. Titration is used to check that there is no longer any free NCO present. Solids (SC) theoretical: 63%; NCO content based on solution when the DMP deblocks on baking of the clearcoat: 4.10%

Preparation of the Coating Compositions of Examples 1 to 2 and of Comparative Examples C1 to C4, and Production of the Coatings of Examples 1 to 2 and of Comparative Examples C1 to C4

The components specified in table 3 are used to prepare the clearcoat materials of inventive examples 1 to 2 and of comparative examples C1 to C4, by combining and stirring together the components specified in table 3 until a homogeneous mixture is produced.

TABLE 3

Composition of the coating compositions of examples 1 to 2 and of comparative examples C1 to C4

|  | Example 1 | Comp. ex. C1 | Example 2 | Comp. ex. C2 | Comp. ex. C3 | Comp. ex. C4 |
|---|---|---|---|---|---|---|
| blocked polyacrylate (A1)[1)] | 38.1 |  | 38.1 |  | 38.1 |  |
| nonblocked polyacrylate (A'1)[2)] |  | 23.4 |  | 23.4 |  | 23.4 |
| Dynoadd F1[3)] | 0.2 | 0.2 | 0.2 | 0.2 | 0.2 | 0.2 |
| Tinuvin ® 384[4)] | 0.6 | 0.6 | 0.6 | 0.6 | 0.6 | 0.6 |
| Tinuvin ® 292[5)] | 0.6 | 0.6 | 0.6 | 0.6 | 0.6 | 0.6 |
| Butyl acetate |  | 14.7 |  | 14.7 |  | 14.7 |
| Aktivator[6)] | 4.0 | 4.0 | 4.0 | 4.0 | 4.0 | 4.0 |
| Dynapol ® 1203[7)] | 5.4 | 5.4 | 5.4 | 5.4 | 5.4 | 5.4 |
| Curing agent B1[8)] | 51.1 | 51.1 |  |  |  |  |
| Curing agent B2[9)] |  |  | 51.1 | 51.1 |  |  |
| Curing agent B3 (comp.)[10)] |  |  |  |  | 51.1 | 51.1 |
| Total | 100 | 100 | 100 | 100 | 100 | 100 |

Key to table 3:
[1)] above-described polyacrylate A1 with blocked hydroxyl groups
[2)] above-described polyacrylate A'1 with nonblocked hydroxyl groups
[3)] Dynoadd F1 = commercial, polyfunctional, surface-active additive from HertfelderGmbH, Bielefeld
[4)] Tinuvin ® 384 = commercial light stabilizer based on a benzotriazole, from Ciba
[5)] Tinuvin ® 292 = commercial light stabilizer based on a sterically hindered amine, from Ciba
[6)] Activator = 1% strength dibutyltin dilaurate solution in a mixture of 80 parts of butyl acetate and 20 parts of xylene
[7)] Dynapol ® 1203 = commercial catalyst from Evonik
[8)] above-described curing agent B1 having silane groups and blocked isocyanate groups
[9)] above-described curing agent B2 having silane groups and blocked isocyanate groups
[10)] above-described curing agent B3 having silane groups and blocked isocyanate groups The storage stability after storage at 40° C. of the resultant coating compositions of examples 1 to 2 and of comparative examples C1 to C4 is determined by first ascertaining the initial viscosity and thereafter the viscosity after storage at 40° C. for 7, 14, 21, 28, and 35 days, the viscosity being determined as the flow time from the DIN4 cup at 23° C. The results are reported in table 4.

resistance of the surfaces of the resultant coatings was determined by means of the crockmeter test (along the lines of EN ISO 105-X12 with 10 double rubs and an application force of 9N, using 9 μm sandpaper (3M 281Q Wetordry™ Production™)), with subsequent determination of the residual gloss at 20° C., with a commercial gloss instrument. The results are reported in table 5.

TABLE 4

Storage stability of the coating compositions of examples 1 to 2 and of comparative examples C1 to C4

Viscosity in seconds[1)]
after storage at 40° C.

| after days | Example 1 | Comp. ex. C1 | Example 2 | Comp. ex. C2 | Comp. ex. C3 | Comp. ex. C4 |
|---|---|---|---|---|---|---|
| Initial viscosity | 21 | 21 | 21 | 21 | 21 | 21 |
| 7 days | 21 | gelled | 21 | gelled | gelled | gelled |
| 14 days | 21 |  | 21 |  |  |  |
| 21 days | 21 |  | 21 |  |  |  |
| 28 days | 22 |  | 22 |  |  |  |
| 35 days | 21 |  | 23 |  |  |  |

[1)] Viscosity measured as flow time from the DIN4 cup at 23° C.

The properties of the coating were tested following pneumatic application of the coating compositions at 2.5 bar in three spray passes to a commercial solid-color black aqueous basecoat from BASF Coatings AG. The basecoat was applied beforehand to commercial bonderized steel panels from Chemetall, which were coated with a commercial baked electrocoat from BASF Coatings AG and with a commercial baked primer from BASF Coatings AG. Thereafter the resulting coating is flashed at room temperature for 5 minutes and then baked at 140° C. for 22 minutes.

The gloss of the surface is determined using a gloss meter (type: Micro Haze Plus) from BYK-Gardner. The scratch

TABLE 5

Properties of the coatings of examples 1 to 2 and of comparative example C3

|  | Example 1 | Example 2 | Comp. ex. C3 |
|---|---|---|---|
| Gloss | 85 | 85 | 85 |
| Residual gloss after crockmeter in % | 85 | 85 | 85 |

What is claimed is:

1. A coating composition based on aprotic solvents and comprising:
   (A) at least one hydroxyl-containing member selected from the group consisting of hydroxyl-containing polyacrylate, hydroxyl-containing polymethacrylate, hydroxyl-containing polyurethane, hydroxyl-containing polyester, hydroxyl-containing polysiloxane, and combinations comprising two or more of the foregoing group; and
   (B) at least one compound (B) comprising blocked isocyanate groups and alkoxysilane groups,
   wherein
   (i) the hydroxyl groups of component (A) are blocked with at least one acyclic orthoester,
   (ii) the compound (B) has at least one structural unit (II) of the formula (II)

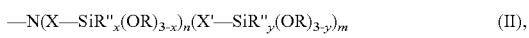
   $$-N(X-SiR''_x(OR)_{3-x})_n(X'-SiR''_y(OR)_{3-y})_m \quad (II),$$

where
   R=hydrogen, cycloalkyl radical or alkyl radical, it being possible for the carbon chain to be interrupted by nonadjacent oxygen, sulfur or NRa groups, where Ra=alkyl, cycloalkyl, aryl or aralkyl,
   X, X'=linear and/or branched alkylene or cycloalkylene radical having 1 to 20 carbon atoms,
   R''=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
   n=0 to 2, m=0 to 2, m+n=2, and x, y=0 to 2,
   and
   (iii) at least 90 mol % of the total alkoxysilane groups present in component (B) are ethoxysilane groups $SiOC_2H_5$.

2. The coating composition of claim 1, wherein the hydroxyl groups of component (A) are blocked with at least one acyclic orthoester of the formula (I)

where
R$_1$, R$_2$, and R$_4$ are identical or different radicals and independently of one another are a linear and/or branched alkylene or cycloalkylene radical having 1 to 8 carbon atoms, and R$_3$ is hydrogen or an alkylene radical having 1 to 6 carbon atoms.

3. The coating composition of claim 1, wherein at least a part of the compound (B) additionally has at least one structural unit (III) of the formula (III)

$$-NR_s-(X-SiR''_x(OR)_{3-x}) \quad (III),$$

where
R$_s$=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl
R, R'', and X have the definition stated for formula (II), and x=0 to 2.

4. The coating composition of claim 1, wherein the radical R is at least one of an ethyl radical or a mixture of a methyl radical plus an ethyl radical.

5. The coating composition of claim 1, wherein at least 95 mol % of the total alkoxysilane groups present in component (B) are ethoxysilane groups $SiOC_2H_5$.

6. The coating composition of claim 1, wherein the coating composition has a calculated silicon content of 2.0% to 7.0% by mass Si, based in each case on the solids content of the coating composition.

7. The coating composition of claim 1, wherein the isocyanate groups of the compound (B) are blocked with a pyrazole.

8. The coating composition of claim 2, wherein the hydroxyl groups of component (A) are blocked with an orthoester of acetic acid, selected from the group consisting of trimethyl orthoacetate, triethyl orthoacetate, and mixtures thereof.

9. The coating composition of claim 1, wherein component (A) comprises primary hydroxyl groups.

10. The coating composition of claim 1, comprising as compound (A) a hydroxyl-containing polyacrylate resin and a polymethacrylate resin.

11. The coating composition of claim 1, wherein the coating composition further comprises at least one member selected from the group consisting of an acid-based catalyst, an organometallic compound, and combinations of the foregoing.

12. The coating composition of claim 2, obtained by reacting the hydroxyl-containing compounds (A) with the orthoesters (I) using an excess of more than 100 mol %, based on the amount of hydroxyl groups in the compounds (A).

13. A multistage coating process comprising:
   applying a pigmented basecoat to an optionally precoated substrate, and
   thereafter applying a coat of the coating composition of claim 1 to the applied pigmented basecoat.

14. The process of claim 13, wherein the coat applied to the pigmented basecoat is a clearcoat material.

15. A multicoat color and/or effect coating system comprising at least one pigmented basecoat and at least one clearcoat disposed thereon, wherein the clearcoat comprises the coating composition of claim 1.

16. The coating composition of claim 7, wherein the isocyanate groups of the compound (B) are blocked with 3,5-dimethylpyrazole.

17. The coating composition of claim 1 wherein the isocyanato-containing compound (B) was prepared from at least one member selected from 1,6-hexamethylene diisocyanate, isocyanurate trimers thereof, allophanate dimers thereof, and combinations of two or more of the foregoing.

18. The coating composition of claim 11, wherein the coating composition comprises at least one acid-based catalyst based on p-toluenesulfonic acid.

19. The coating composition of claim 1 wherein the coating composition further comprises at least one organometallic compound.

20. The coating composition of claim 12 obtained by reacting the hydroxyl containing compounds (A) with the orthoesters (I) using an excess of 150 to 250 mol %, of orthoester (I), based on the amount of hydroxyl groups in the compounds (A).

* * * * *